(No Model.)  3 Sheets—Sheet 2.
D. LUBIN.
CLOD CRUSHER.
No. 350,832. Patented Oct. 12, 1886.
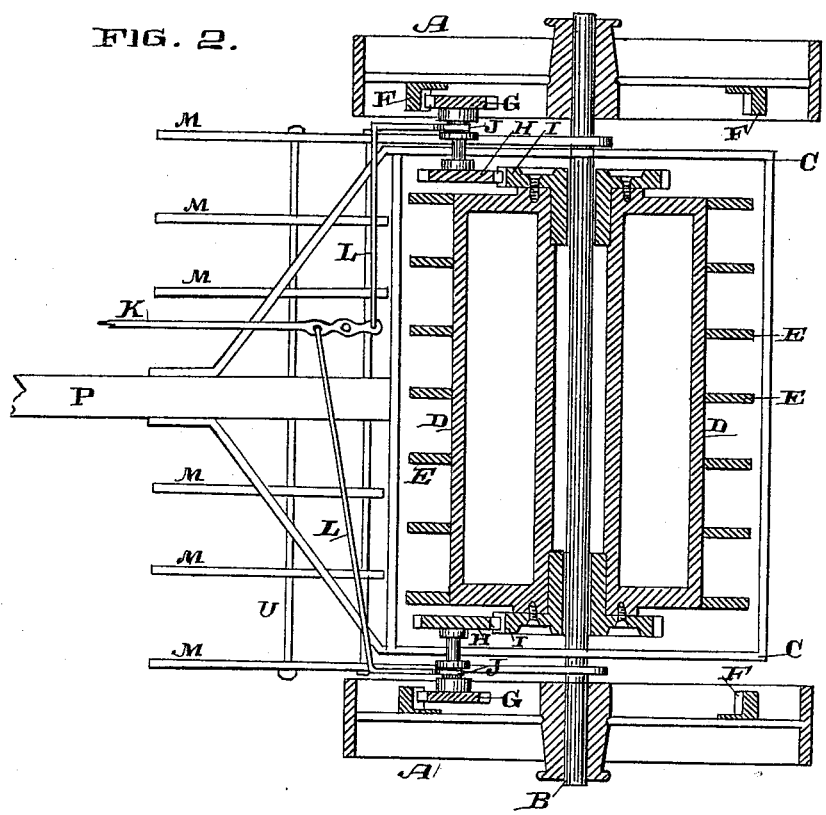
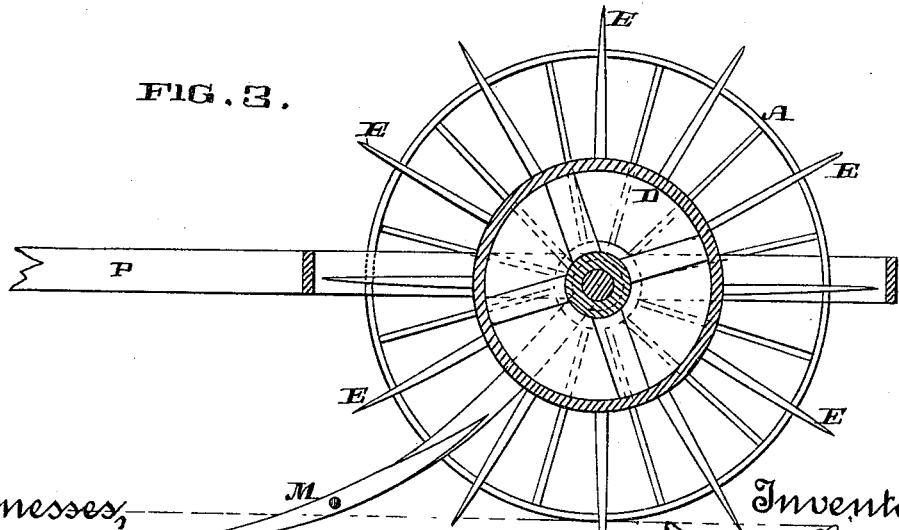
Witnesses,
Geo. H. Strong
J. H. House
Inventor
David Lubin
By Dewey & Co.
att'ys (No Model.) 3 Sheets—Sheet 3.

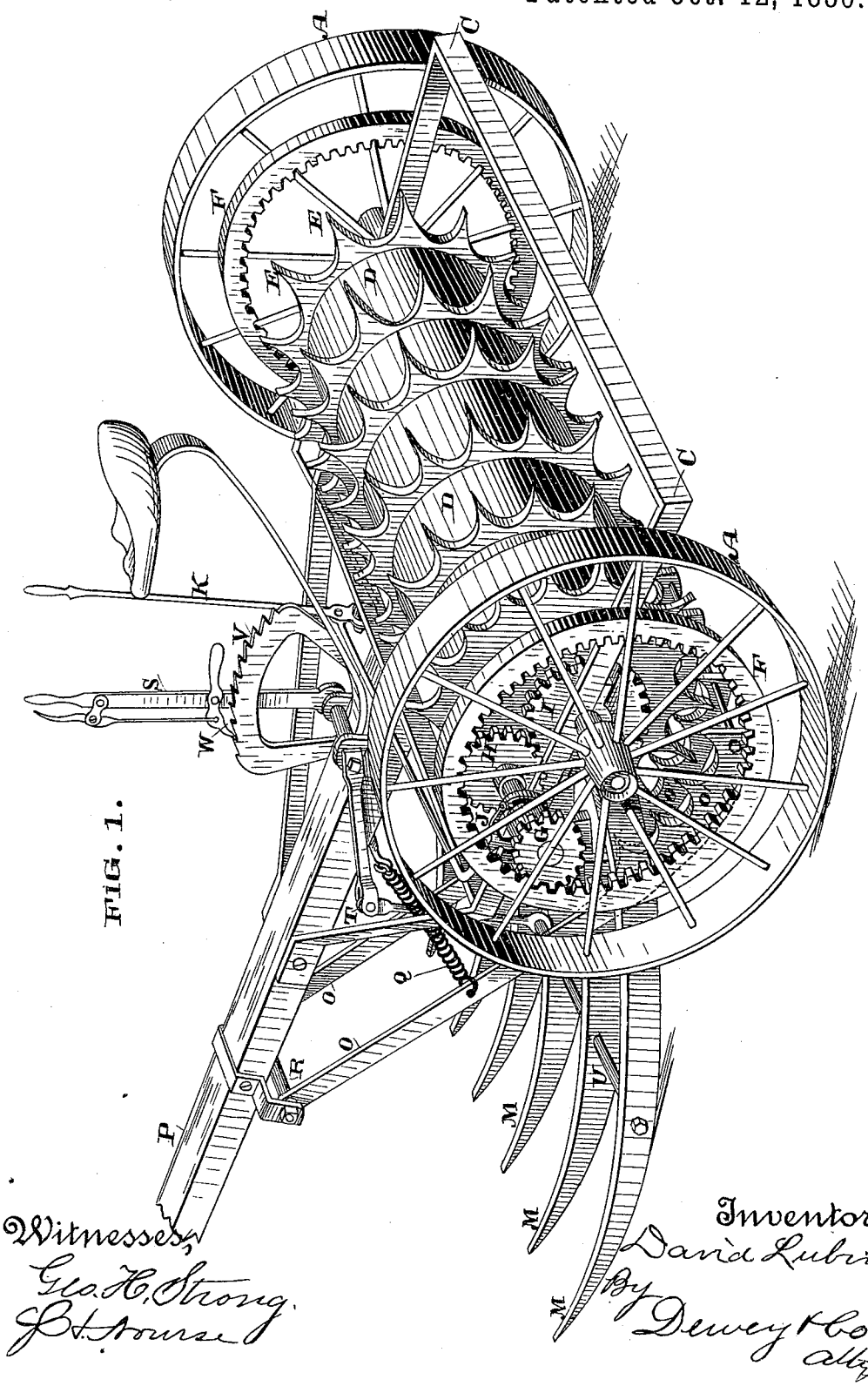

D. LUBIN.
CLOD CRUSHER.

No. 350,832. Patented Oct. 12, 1886.

Witnesses,
Geo. H. Strong.

Inventor,
David Lubin
By Dewey & Co.
attys

UNITED STATES PATENT OFFICE.

DAVID LUBIN, OF SACRAMENTO, CALIFORNIA.

CLOD-CRUSHER.

SPECIFICATION forming part of Letters Patent No. 350,832, dated October 12, 1886.

Application filed August 11, 1886. Serial No. 210,639. (No model.)

*To all whom it may concern:*

Be it known that I, DAVID LUBIN, of Sacramento, Sacramento county, State of California, have invented an Improvement in Clod-Crushers; and I hereby declare the following to be a full, clear, and exact description of the same.

My invention relates to an apparatus for crushing and pulverizing clods or lumps of earth.

It consists of a cylinder having a series of radially-projecting points or spikes, this cylinder being mounted upon a frame-work which is supported upon bearing-wheels with gearing, by which it is caused to rotate at any desired rate of speed, a series of arms or fingers projecting toward the front, their front pointed ends being adapted to take up the lumps of earth as the machine is drawn over the ground and carry them upward and backward to a point where they will be acted upon by the toothed disks, which crush and pulverize them, afterward allowing them to drop upon the ground and behind the fingers.

It also consists in certain details of construction and adjustment, which will be more fully explained by reference to the accompanying drawings, in which—

Figure 4:
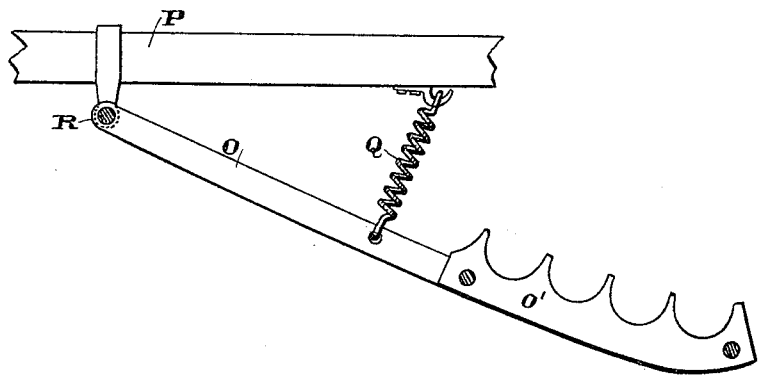
Figure 5:
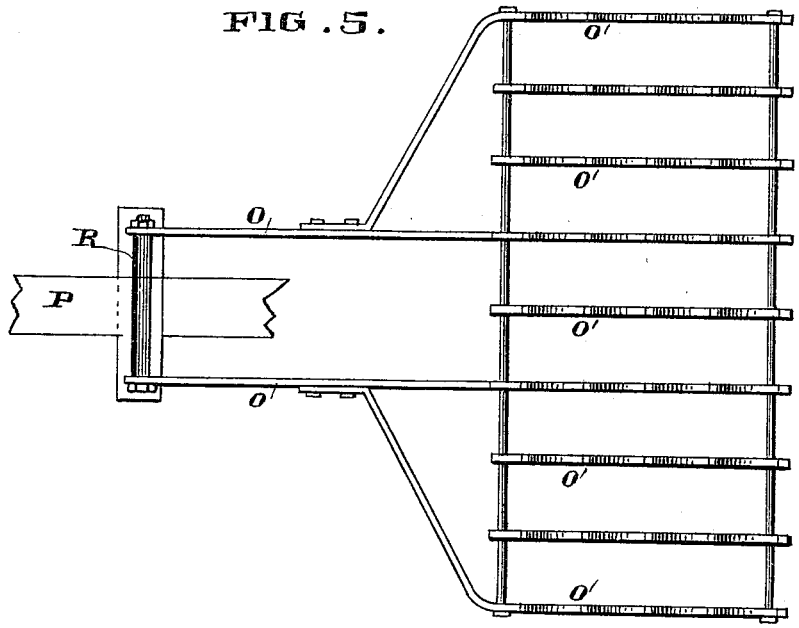

Figure 1 is a perspective view of the apparatus. Fig. 2 is a horizontal section through the cylinder and bearing-wheels. Fig. 3 is a vertical section taken through the cylinder and frame. Fig. 4 is a sectional view of the corrugated bars. Fig. 5 is a plan view of the corrugated bars.

A A are two bearing-wheels of any suitable size, having a face sufficient to support the apparatus while traveling over the ground. B is an axle upon which these wheels are journaled; and C is the frame, which is supported upon the axle.

D is a cylinder turning upon the axle, and having disks with pointed teeth or radial projections E fixed to it at intervals from one end to the other. This cylinder, with its radial projecting arms or points, is in the present case caused to rotate by means of an internally-toothed gear-wheel, F, fixed to the driving-wheels and engaging with pinions G. These pinions are mounted upon shafts with other pinions, H, which engage the pinions I upon the cylinder-shaft, so as to rotate it at any desired rate of speed. It will be manifest, however, that the cylinder D may be fixed directly to the axle, so as to rotate with it, and without any gearing.

J J are clutch-couplings, by which the pinions G or H may be thrown out of engagement, so as to stop the cylinder whenever desired. These are operated by means of a lever, K, and connecting-rods L. (Shown more clearly in Fig. 2.)

M M are a series of arms or fingers suspended by suitable frame-work from the frame C or the axle, so that their pointed front ends will serve to take up any lumps or clods of earth which are larger than the openings between these arms or fingers. The arms incline upward and backward to a point near the drum or cylinder D, where they deliver the clods upon a series of corrugated bars, O', which extend downward and backward beneath the cylinder, corresponding in position with the fingers M. These bars are supported, as shown, from the arms O, and may be corrugated upon the upper edges to prevent the lumps or clods from being swept off without crushing, and it will be manifest that when the cylinder is rotated the points E will pass between the rear ends of these arms, and any clods or lumps of earth which have been brought up on these arms will be crushed and pulverized by the action of these teeth or points.

In order to relieve the parts of any strains—such as are brought upon them by a stone or anything which could not be crushed, which might be carried up by the lifting-arms—the links O, by which the rear ends of these arms are sustained, are held in place by means of springs Q, which extend from the pole or frame-work of the apparatus down to these links, at some point behind the fulcrum, which in the present case is shown at R, on the pole at some distance forward of the main frame and cylinder.

In order to make the cylinder-points E more effective, they may be lengthened to such a distance, as shown in Fig. 3, so that they not only pass between the rear arms, M, but also extend downward so far that they will enter the ground, by reason of having a length somewhat greater than the diameter of the bearing-wheels A. These points, entering the ground in this manner, will serve to break up and pulverize and loosen any lumps or clods which may have passed between the arms M, and they also serve to loosen up the general surface to a considerable extent.

When it is desired to travel without doing any work, the clutches may be operated to throw the gearing which drives the cylinder and toothed arms out of engagement with the gears on the bearing-wheels, and the points M may also be raised by means of a lever, S, which operates links T, connecting with the rods U, by which the teeth are united, so that the front ends may be raised entirely from the surface.

V is a rack, and W is a spring-pawl attached to the lever S, so as to engage with this rack and hold the lever and its connected parts at any desired point.

Having thus described my invention, what I claim as new, and desire to secure by Letters Patent, is—

1. The drum or cylinder having the radially-projecting arms or points, and mechanism by which it is rotated, and a series of arms or lifters and bars extending within the periphery of the cylinder, between the rear ends of which the projecting points pass, substantially as herein described.

2. The cylinder having the points projecting radially from its surface mounted upon a frame, with bearing-wheels and intermediate gearing by which the cylinder is caused to rotate, arms or lifters by which the clods or lumps are raised from the surface and carried upward and backward to a point where they are struck and pulverized by the teeth of the cylinder, in combination with the engaging-clutches and an operating-lever, whereby the cylinder may be started or stopped, substantially as herein described.

3. A rotating cylinder having the radially-projecting teeth or points, the series of arms or lifters, the forward ends or points of which travel upon the surface of the ground, the rear ends extending backward, and corrugated bars between the points of the radially-projecting teeth, in combination with links by which the rear ends of the bars are suspended, and a spring connected with the links, substantially as and for the purpose herein described.

4. The cylinder having the radially-projecting arms or teeth, the frame, bearing-wheels, and gearing by which the cylinder is caused to rotate, a series of arms or lifters by which the lumps or clods are raised or carried upward and backward, and bars between which the projecting points or teeth of the cylinder pass so as to crush the clods, and an elastic suspending device for the bars, in combination with a lever and mechanism whereby the points of the lifting-arms may be raised clear of the surface, substantially as herein described.

In witness whereof I have hereunto set my hand.

DAVID LUBIN.

Witnesses:
 PAT. KELLY,
 FRANK McCULLOUGH.